(12) United States Patent
Eshghi et al.

(10) Patent No.: US 8,972,410 B2
(45) Date of Patent: Mar. 3, 2015

(54) IDENTIFYING RELATED OBJECTS IN A COMPUTER DATABASE

(75) Inventors: Kave Eshghi, Los Altos, CA (US); Shyam Sundar Rajaram, Mountain View, CA (US); Charlie Dagli, Urbana, IL (US); Ira Cohen, Modiin (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1454 days.

(21) Appl. No.: 12/463,972

(22) Filed: May 11, 2009

(65) Prior Publication Data

US 2010/0030780 A1 Feb. 4, 2010

Related U.S. Application Data

(60) Provisional application No. 61/084,986, filed on Jul. 30, 2008.

(51) Int. Cl.
*G06F 7/00* (2006.01)
*G06F 17/30* (2006.01)

(52) U.S. Cl.
CPC .... *G06F 17/30607* (2013.01); *G06F 17/30271* (2013.01); *G06F 17/3069* (2013.01)
USPC ............ 707/747; 707/749; 707/769; 382/218

(58) Field of Classification Search
USPC .......................... 707/749, 747, 769; 382/118
See application file for complete search history.

(56) References Cited

U.S. PATENT DOCUMENTS

| | | | |
|---|---|---|---|
| 5,915,250 A * | 6/1999 | Jain et al. ............................. | 1/1 |
| 6,754,675 B2 * | 6/2004 | Abdel-Mottaleb et al. ........... | 1/1 |
| 7,028,038 B1 * | 4/2006 | Pakhomov ................... | 707/765 |
| 7,043,474 B2 * | 5/2006 | Mojsilovic et al. ................... | 1/1 |
| 7,574,036 B2 * | 8/2009 | Akahori ........................ | 382/159 |
| 7,574,451 B2 * | 8/2009 | Burges et al. ......................... | 1/1 |
| 7,647,331 B2 * | 1/2010 | Li et al. .......................... | 382/218 |
| 7,734,622 B1 * | 6/2010 | Fitzhugh ........................ | 707/722 |
| 7,877,388 B1 * | 1/2011 | Lamping et al. ................ | 707/737 |
| 8,015,190 B1 * | 9/2011 | Bayardo et al. ................. | 707/741 |
| 8,024,343 B2 * | 9/2011 | Gallagher ....................... | 707/737 |
| 2002/0022956 A1 * | 2/2002 | Ukrainczyk et al. .............. | 704/9 |
| 2003/0078899 A1 * | 4/2003 | Shanahan ......................... | 706/8 |

(Continued)

OTHER PUBLICATIONS

Charikar, M. S., "Similarity estimation techniques from rounding algorithms," In Proceedings of the Thirty-Fourth Annual ACM Symposium on theory of Computing (Montreal, Quebec, Canada, May 19-21, 2002). STOC '02. ACM, New York, NY, 380-388.

(Continued)

*Primary Examiner* — Sherief Badawi
*Assistant Examiner* — Christopher J Raab
(74) *Attorney, Agent, or Firm* — Hewlett-Packard Patent Department

(57) ABSTRACT

Provided are, among other things, systems, methods and techniques for identifying related objects in a computer database. In one representative implementation: (a) a feature vector that describes an existing object is obtained; (b) comparison scores are generated between the feature vector and various sample vectors; (c) a set that includes at least one designated vector is identified from among the sample vectors by evaluating the generated comparison scores; (d) a computer database is searched for matches between label(s) for the designated vector(s) and labels for representative vectors for other objects represented in the computer database; and (e) at least one related object is identified based on the identified match(es).

15 Claims, 4 Drawing Sheets

(56) References Cited

U.S. PATENT DOCUMENTS

| | | | |
|---|---|---|---|
| 2005/0063590 A1* | 3/2005 | Simon et al. | 382/181 |
| 2008/0205774 A1* | 8/2008 | Brinker et al. | 382/225 |
| 2009/0034805 A1* | 2/2009 | Perlmutter et al. | 382/118 |
| 2009/0248687 A1* | 10/2009 | Su et al. | 707/6 |
| 2009/0313294 A1* | 12/2009 | Mei et al. | 707/103 R |
| 2011/0085739 A1* | 4/2011 | Zhang et al. | 382/218 |
| 2011/0194780 A1* | 8/2011 | Li et al. | 382/218 |

OTHER PUBLICATIONS

Manku, G. S., Jain, A., and Das Sarma, "Detecting near-duplicates for web crawling", In Proceedings of the 16th international Conference on World Wide Web (Banff, Alberta, Canada, May 8-12, 2007). WWW '07. ACM, NewYork, NY, 141-150. DOI= http://doi.acm.org/10.1145/1242572.1242592.

* cited by examiner

IDENTIFYING RELATED OBJECTS IN A COMPUTER DATABASE

CROSS REFERENCE TO RELATED APPLICATIONS

This Application claims the benefit of U.S. Provisional Application Ser. No. 61/084986, filed Jul. 30, 2008, titled "Identifying Related Objects In a Computer" which is hereby incorporated by reference herein as if reproduced in full below.

FIELD OF THE INVENTION

The present invention pertains, among other things, to systems, methods and techniques for querying a computer database in order to identify one or more objects that are related to an input query object.

BACKGROUND

It sometimes is the case that one wishes to query a very large database with respect to an input object (e.g., a text document or a photograph), i.e., in order to identify other objects represented within the database that are, e.g., identical or very similar to the input object. Identifying objects that are exactly identical to an input object generally can be performed very quickly using straightforward techniques. Unfortunately, simply identifying data objects that are exactly identical to the query object often will not be very useful, because highly relevant objects, even ones with just a single slight difference from the input object, would not be detected.

As a result, certain techniques have been developed that are capable of identifying both exact and close matches. Examples include the techniques described in commonly assigned U.S. provisional patent application Ser. No. 61/024,630, filed Jan. 30, 2008 (the '630 application), which application is incorporated by reference herein as though set forth herein in full. Unfortunately, while the approaches described in the '630 application work well in many situations, they may not be optimal in all situations.

Other examples include the random hyperplane technique described, e.g., in Charikar, M. S., "Similarity estimation techniques from rounding algorithms," In Proceedings of the Thirty-Fourth Annual ACM Symposium on theory of Computing (Montreal, Quebec, Canada, May 19-21, 2002), STOC '02. ACM, New York, N.Y., 380-388, and the locality sensitive hashing technique. While these techniques have certain benefits, improvements remain desirable.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

DESCRIPTION OF THE PREFERRED EMBODIMENT(S)

Figure 1:
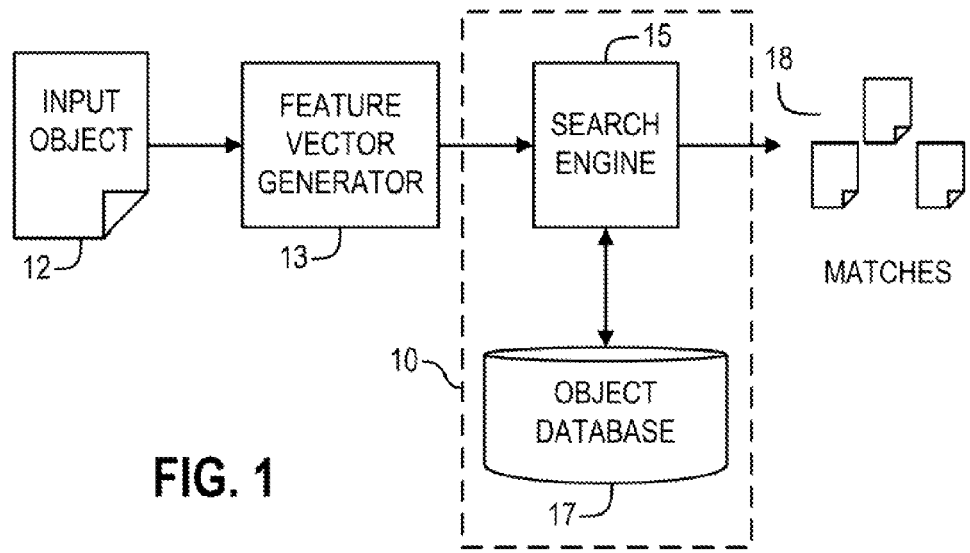
FIG. 1 is a block diagram illustrating a database-searching system.

FIG. 1 is a block diagram illustrating a system 10 according to a representative embodiment of the present invention. As shown, an input object 12 can be considered to be the source of the input provided to system 10. Although illustrated as a document (e.g., containing text and/or images) in FIG. 1, it should be understood that input object 12 can in fact be any chunk of data or anything from which data can be extracted, measured or observed, such as a physical object, a person, a population, a circumstance, an event or a phenomenon, (each being an example of an "object", as such term is used herein). However, the input object 12 preferably is an existing real-world object (referred to herein as an "existing object") that includes (or can be processed to produce) a set of physical or otherwise real-world attributes that can be measured or observed and that collectively characterize the object in certain respects once data values have been determined for such attributes.

The values of the attributes for input object 12 preferably are provided to system 10 in the form of a feature vector (discussed in more detail below) that characterizes or describes the input object 12. In many cases, the feature vector is generated by an automated feature generator 13. For example, feature vector generator 13 can be implemented within a general-purpose computer processor executing computer-executable process steps out of a computer-readable medium, or by using any of the other automated techniques described herein. Also, although feature vector generator 13 is shown as being outside the system 10, in certain embodiments feature vector generator 13 is included within system 10. Still further, in other embodiments the feature vector generator 13 is only partly automated or is even implemented entirely manually.

The generated feature vector(s) can include data values for any set of features that describe the input object 12, or some portion of it. In the preferred embodiments, each system 10 according to the present invention is configured to accommodate one or more categories of input objects 12, and the features included within the generated feature vector(s) are representative of the objects within the subject category.

For example, if the input object 12 is a text document, the features extracted by feature vector generator 13 can include a list of the words (or terms) that are found within the document, potentially together with their frequencies or relative frequencies of occurrence. On the other hand, if the input object 12 is a photograph, then there potentially can be multiple feature vectors generated with the feature vector generator 13, e.g., one for each of certain attention points in the photograph or one for each of certain sets of attention points in the photograph. A discussion regarding the use of attention points is provided in commonly assigned U.S. patent application Ser. No. 11/830,841, titled "Hash-Based Image Identification", filed on Jul. 30, 2007, which application is incorporated by reference herein as though set forth herein in full.

In any event, the output of feature vector generator 13 is input into a search engine 15 according to the present invention. Preferably, search engine 15 identifies any data objects within a computer database 17 that are "similar" to the input query object 12 by first identifying one or more labels (sometimes referred to herein as codes or hashes) that characterize the input feature vector(s) and then searching for other objects within database 17 having matching labels, according to a specified matching criterion. Such functionality is described in more detail below. In certain embodiments, the output of search engine 15 is a set of one or more matching objects 18 (or, more typically, a set of identification codes for the matching object(s) 18). As discussed in more detail below, these search results can be simply provided to the individual or entity that submitted the query or can be further processed, depending upon the particular embodiment. As used herein, the term "database" or "computer database" refers to any collection of data stored within (e.g., computer memory, hard disk or other temporary or long-term memory or storage), or otherwise accessible to a computer or processor-based device. In some embodiments, such a database is indexed for faster retrieval with respect to certain kinds of queries.

Figure 2:
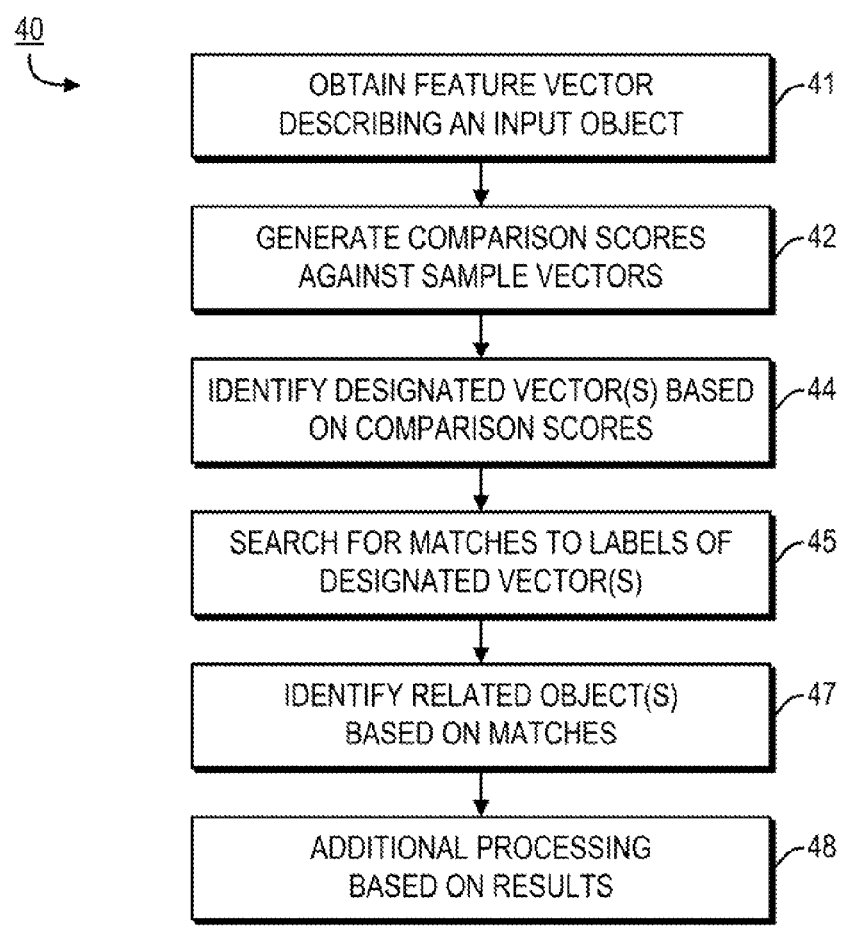
FIG. 2 is a flow diagram of a process that involves searching for related objects, according to a first representative embodiment of the present invention.
Figure 3:
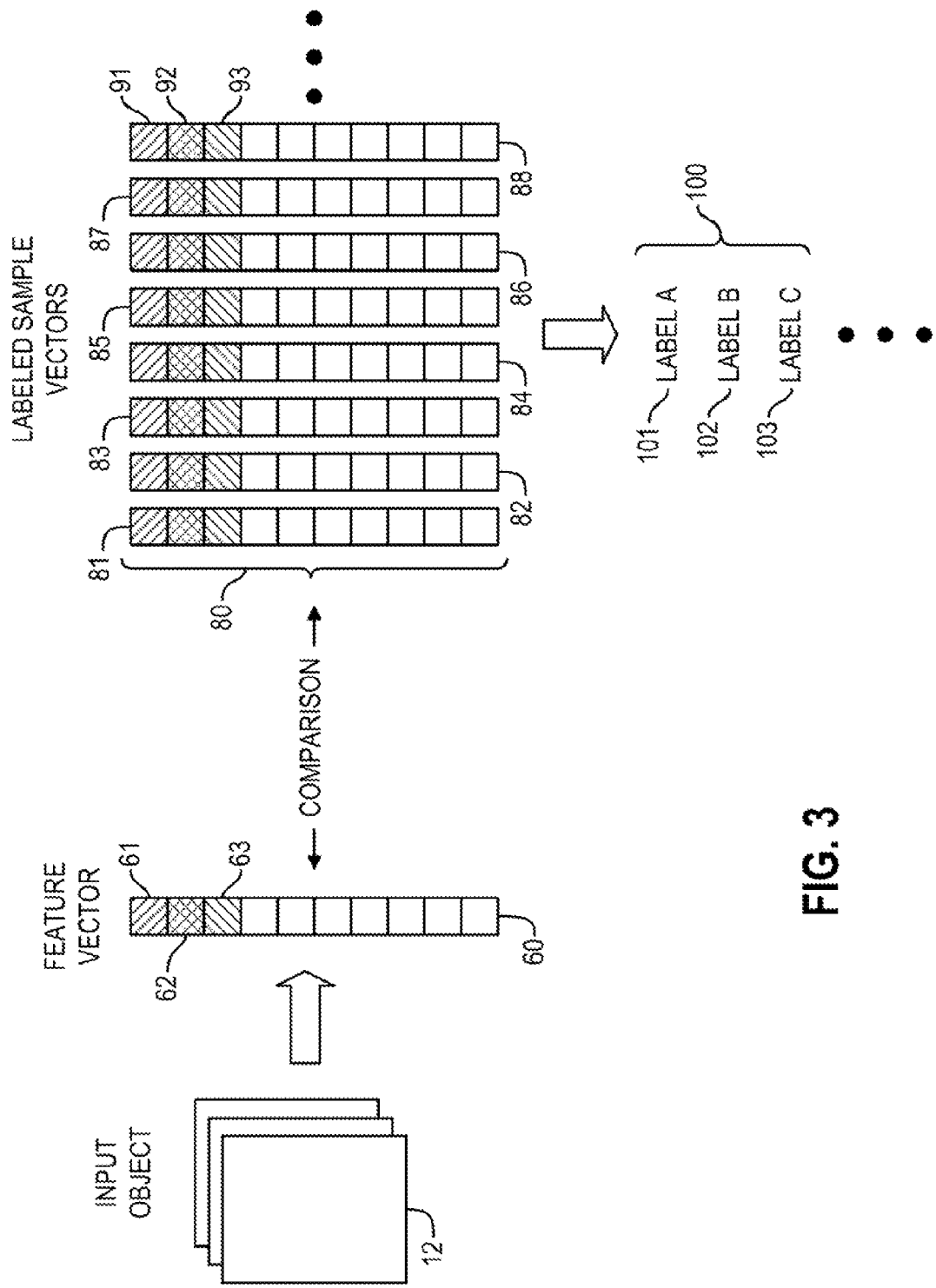
FIG. 3 is a block diagram illustrating the generation of characteristic labels for an input object.

A process 40 implemented by search engine 15 according to certain representative embodiments of the present invention is now discussed with reference to the flow diagram shown in FIG. 2 and the block diagram shown in FIG. 3. In the preferred embodiments, process 40 is fully automated, e.g., so that it can be implemented by a processor reading and executing process steps out of a computer-readable medium, or in any of the other ways described herein.

Initially, in step 41 a feature vector 60 is obtained for an input object 12 (which preferably is an "existing object", as discussed above). It is noted that the present embodiment generally contemplates the input of a single feature vector 60 for the object 12 (which preferably is the case for a textual document); another embodiment described below focuses on the case in which multiple feature vectors are obtained for the input object 12. Preferably, each element of the feature vector 60 (e.g., elements 61-63) corresponds to a different attribute of the input object 12, with such attributes being fixed across all potential input objects 12 within the same overall category.

For example, in one embodiment for processing text documents, each element corresponds to a unique word (or, more preferably, a unique term) and, for any given input object 12, the data value at that position indicates something about the occurrence of that term within the document. In one variation of this example, the vector elements are binary, with a data value of 1 indicating that the term exists somewhere in the document and a data value of 0 indicating that it does not. In other variations, the data value indicates how frequently the term appears in the document, e.g., a simple count value, a normalized count value (e.g., number of occurrences per 10,000 terms), or any other function of the count value. As used herein, the concept of a "term" incorporates some pre-processing of the existing words (e.g., using stemming, truncation, synonyms or the like), as appropriate, in order to normalize across contextually similar, although not identical, word usage.

Where the input object 12 is a person, the attributes of the feature vector 60 can correspond to any characteristics, such as individual books or movies (with the data values reflecting how much the individual liked or disliked the particular book or movie), individual physical characteristics (with the data values being measured simply, weight, etc.), individual income and/or spending characteristics (with the data values reflecting amount of money earned from different sources and/or spent in different categories), individual educational attributes, individual attributes pertaining to Internet activity (e.g., frequencies of visits to particular sites), the person's genome sequence and/or any other features.

Preferably, the attributes chosen to be included within the feature vector 60 reflect the features that are deemed most important in determining whether to identify a match. Thus, for example, if the input object 12 is a population, then the feature vector elements might reflect survey data if the population's attitudes are deemed important or a demographic data if that data is deemed most important.

As will be readily appreciated, an individual feature vector 60 potentially can include hundreds, thousands or even tens of thousands of elements (reflecting a corresponding number of different attributes), within a single general overall category (e.g., any of the categories noted above) or taken from multiple different categories. Directly comparing such an input feature vector 60 to similarly generated feature vectors for other objects represented within database 17, particularly where one is looking for both "similar" and identical matches, typically would be computationally prohibitive. The techniques implemented by search engine 15 in the preferred embodiments of the invention address this problem.

Thus, in step 42 the input vector 12 is compared against each of a plurality of different sample vectors (e.g., K sample vectors, each having N elements, represented as an N×K matrix P of real numbers). Each such comparison preferably results in a comparison score. For example, in one embodiment the score associated with a particular sample vector is the inner product of the input vector 12 and such sample vector, i.e., $$\text{Score} = v \cdot u = \sum_{i=1}^{N} v_i u_i,$$

where v is the feature vector 60, u is the subject sample vector, and the subscript i denotes the element number of the corresponding vector, with each of V, u ∈ $R^N$, where $R^N$ is the space of all N dimensional real vectors.

In alternate embodiments, the feature vector 60 is preprocessed prior to calculating the inner product. One potential category of such preprocessing can be referred to as self-normalization. For example, if the mean of the feature vector 60 is defined as:

$$m = \frac{\sum_{i=1}^{N} v_i}{N},$$

then the normalization of v around the mean can be defined as the vector:

$$\hat{v} = [v_1 - m, v_2 - m, \ldots, v_N - m].$$

If the magnitude or length of the feature vector v is defined as:

$$l(v) \sqrt{\sum_{i=1}^{N} v_i^2},$$

then the length-normalization of v can be defined as the vector:

$$\hat{v} = [v_1/l(v), v_2/l(v), \ldots, v_N/l(v)].$$

In certain preferred embodiments, both such normalizations are performed, i.e., by first normalizing around the mean and then normalizing to unit length.

A second potential category of preprocessing can be referred to as global normalization. Here, the normalization is performed relative to feature vectors for other objects drawn from the same category as the input object 12, or relative to expectations regarding such other feature vectors. For example, if the element-specific expectation for each element $v_i$ of feature vector v across some specified category C from which v is drawn is defined as:

$$m_i = E_C\{v_i\} = \sum_{y_j \in C} y_{ji} p(y_j),$$

where $y_{ji}$ is the ith element of vector $y_j$ drawn from category C and $p(y_j)$ is the probability of vector $y_j$ occurring within category C, then the global mean-normalization of vector v can be defined as:

$$\hat{v} = [v_1 - m_1, v_2 - m_2, \ldots, v_N - m_N].$$

Similarly, the global standard-deviation-normalization of vector v can be defined as:

$$\hat{v} = [(v_1 - m_1)/\sigma_1, (v_2 - m_2)/\sigma_2, \ldots, (v_N - m_N)/\sigma_N],$$

where $\sigma_i$ is the expected standard deviation of element $v_i$ across category C. For example, where individual elements of the feature vector 60 represent the occurrence of individual words or terms within a document, such global preprocessing can take into account statistics indicating that certain terms normally occur more frequently than others or that the variability of the usage of certain terms is greater for some than for others.

A further potential category of preprocessing can be referred to as importance adjustment or preference adjustment. Here, the individual elements of the feature vector 60 are emphasized or deemphasized (e.g., using simple multiplicative weighting) in order to reflect that certain elements are relatively more or less important than others in connection with the kinds of matches that the user wishes to identify. Thus, for example, the importance adjustment or preference adjustment of vector v can be defined as:

$$\hat{v} = [v_1 w_1, v_2 w_2, \ldots, v_N w_N].$$

where $w_i$ is the weight assigned to element i. Each such weight can be assigned, e.g., subjectively (e.g., based on the user's expressed preferences), objectively (e.g., using a machine-learning technique) or in accordance with any combination of these two approaches.

It should be noted that the foregoing categories of preprocessing are merely exemplary and any other categories, or specific preprocessing techniques, instead (or in addition) can be used. Also, any combination or permutation of these or other preprocessing techniques can be applied to the input feature vector 60.

However, in certain preferred embodiments, the final step of preprocessing input feature vector 60 is to perform length normalization, and in such embodiments each of the sample vectors 80 (e.g., vectors 81-88) preferably have been generated so as to also have unit length. Then, the inner product of the feature vector 60 and each of the sample vectors will result in a value that is equal to the cosine of the angle between the two vectors.

It should be noted that the foregoing discussion focuses on preprocessing of the feature vector 60 as a way to accomplish certain results. However, it should be readily apparent that the same results can be achieved in other (e.g., mathematically equivalent) ways as well. For example, rather than normalizing the feature vector 60 and all of the sample vectors 80 to unit length, one embodiment simply divides the inner product of the feature vector 60 and each sample vector by the product of the lengths of the two vectors, i.e.:

$$\text{Score} = \frac{u \cdot \hat{v}}{l(u)l(\hat{v})},$$

where $\hat{V}$ designates any preprocessed version of the original feature vector v (e.g., using any permutation of the preprocessing techniques described above). Similarly, any importance adjustment or preference adjustment weights can be applied to the sample vectors 80, rather than to the feature vector 60.

Finally, it is noted that the comparison scores need not be determined based on the vector inner products. Instead, any other measure for comparing the similarity of one vector to another instead can be used (e.g., Hamming distance, Manhattan distance or Euclidean distance), with the preferred preprocessing (particularly any normalization processing) being adjusted accordingly. In any event, the base distance measure for calculating the comparison scores preferably is selected in accordance with the kinds of matches that are desired (e.g., how the user would like to penalize particular kinds of differences). Generally speaking, however, the base distance measure preferably directly compares individual elements in the feature vector 60 with the corresponding elements in the subject sample vector (e.g., as is done in the calculations of the vector inner product, Hamming distance and Manhattan distance); thus, for example, element positions 61-63 in feature vector 60 preferably are compared to element positions 91-93, respectively, in the sample vector under consideration.

The foregoing discussion largely assumes the existence of a set of sample vectors 80. In fact, there are a number of techniques by which the sample vectors 80 could have been generated. For example, in one set of representative embodiments each element of each sample vector is randomly (or pseudo-randomly) generated, both independently of the other elements of the same vector and also independently of the other sample vectors. In one such representative embodiment, each such element is drawn independently (i.e., as an independent instance) from the Gaussian distribution with mean 0 and standard deviation 1. In another such representative embodiment, each such element is drawn independently (i.e., as an independent instance) from the Rademacher distribution, i.e., [1,−1] with equal probability. The Gaussian and Rademacher distributions tend to have very attractive theoretical and experimental properties, although the inner product calculations generally are less expensive to compute when the Rademacher distribution is used.

Alternatively, other representative embodiments use sample vectors 80 that reflect selected patterns (e.g., prototypical patterns that tend to characterize the general category from which the individual input objects 12 are expected to be drawn). For instance, if the object 12 is a textual document and the feature vector 60 is a word or term vector (e.g., as described above), then the individual sample vectors 80 can be selected so as to be representative of particular documents (or kinds of documents) within the subject category (e.g., a random or intentionally selected sampling of documents from the category or similar samplings from each of a variety of different selected sub-categories).

Generally speaking, such pattern-based sample vectors 80 are preferred, provided that an appropriate (i.e., effective) set of pattern templates can be identified for the category of interest. Thus, when designing the sample vectors 80, a particular set of patterns preferably is used only if experimental results indicate that the set produces significantly better results than randomly generated sample vectors (and better results than any other competing pattern-based sets). As noted above, the individual elements in the sample vectors 80 correspond directly to (i.e., represent the same attributes as) the same elements in the feature vector 60; accordingly, the sample vectors 80 preferably are generated from the sample pattern objects in the same way that the pattern vector 60 is generated from input object 12.

The number of sample vectors 80 typically has a direct impact on both processing costs and the granularity at which matches can be identified. Selection of appropriate patterns (rather than generating the sample vectors 80 randomly or distributing them uniformly within a desired portion of the N-dimensional space) often can have the effect of maximizing the effectiveness of the number of sample vectors 80 used, e.g., by targeting them more effectively within the N-dimensional space.

Irrespective of the manner in which sample vectors 80 have been generated and the specific technique used to generate the comparison scores, the same sample vectors 80 and the same comparison score generation technique preferably are used across multiple input feature vectors 60 (i.e., multiple repetitions of process 40 with different feature vectors 60).

Returning to FIG. 2, in step 44 a set of one or more designated vectors, selected from among the sample vectors 80, is identified based on the scores determined in step 42 (there typically being one score for each of the sample vectors 80). In the preferred embodiments, the goal of this step 44 is to identify a set of one or more of such sample vectors to represent feature vector 60, and the selection of the sample vectors 80 to be included within the set is determined based upon a pre-specified identification criterion. More preferably, the identification criterion inherently specifies a pre-specified number of designated vectors to be included within the set, i.e., such identification criterion always results in a selection of the same pre-specified number of designated vectors. In the preferred embodiments, that pre-specified number is at least two, and experimental results have indicated that a pre-specified number of exactly two is ideal. However, in alternate embodiments a single designated vector is selected.

Any of a variety of different identification criterion can be used. In one representative embodiment, the identification criterion is the M sample vectors 80 (M being the pre-specified number) having the highest scores (e.g., representing the M sample vectors that are most similar to the input feature vector 60). Provided that the sample vectors 80 are sufficiently different from each other (particularly when normalized to the same length), such an approach often can essentially identify a kind of similarity space around the input feature vector 60. Accordingly, in such embodiments the pre-specified number of sample vectors 80 to be included within the set can be used as a rough similarity measure, e.g., specifying a higher number where more approximate matches are acceptable and a lower number in situations where matches that are very close to exact are desired. In still further embodiments, multiple iterations are performed, starting with lower numbers and then repeating with higher numbers only if the earlier search results were insufficient.

Alternate embodiments use other identification criteria. For example, in one representative embodiment, the identification criterion is the M sample vectors 80 having the lowest scores (which, for vector inner product scores, typically identifies sample vectors 80 that are opposite feature vector 60).

In any event, each of the sample vectors 80 preferably has a label associated with it, and the designated vector(s) are identified by such label(s) 101-103. Because there can be a large number of sample vectors 80 (e.g., thousands, tens of thousands or even more) and because each resulting label or code is representative in some sense of the input feature vector 60, the resulting label(s) 101-103 can be considered hashes (e.g., approximate hashes) of the feature vector 60. Alternatively, in certain embodiments some or all of the identified labels are concatenated (e.g., in order of similarity scores) or otherwise combined together to form a single hash (e.g., which is then used as a single label).

In step 45, object database 17 is searched in order to identify identical matches to the label(s) identified in step 44. In the preferred embodiments, object database 17 includes labels that are representative of other objects (typically, other existing objects). More preferably, the objects represented in database 17 were processed similarly or identically to the present input object 12, first by generating a feature vector and then by determining one or more labels for the feature vector by comparing the feature vector, e.g., in the same manner, to the same set of sample vectors 80.

In step 47, a set of one or more objects represented within database 17 is identified based on the label matches identified in step 45. Preferably, such objects are identified based on a specified matching criterion. For instance, if two labels have been identified for each object, then the matching criterion can encompass any object that has at least one identical label in common with those of the input object 12. Alternatively, in such an embodiment, the matching criterion could instead encompass only those objects having both labels in common with the query input object 12.

It is noted that the processing in step 45 can be performed in anticipation of the processing to be performed in step 47. For example, if it is known that the matching criterion to be applied in step 47 will require some minimum number of identical labels in common (greater than one), then the searching in step 45 can ignore any matching labels for which the underlying object in database 17 will not satisfy the matching criterion. Alternatively, for example, all identically matching labels could be identified in step 45 and then the matching criterion applied in step 47. This latter approach generally is preferable, e.g., in situations where it is desirable to apply a sequence of different matching criteria (such as by starting with the more restrictive criterion of requiring both labels to match and then applying the less restrictive criterion of requiring only a single identically matching label only if the first criterion failed to provide adequate search results).

Finally, in step 48 any additional processing is performed based on the search results. Such processing preferably is based on the purposes for which system 10 is to be used and, therefore, can include, e.g., any or all of: simply providing the search results to the requesting user, sorting the results by relevance (e.g., those objects represented within database 17 having two matching labels first, followed by those objects having just a single matching label), performing clustering based on the search results, and/or identifying a related cluster and then performing cluster-based information retrieval.

For example, in a representative search system according to the present invention, a user submits a query object for which he or she would like to identify any similar objects, sorted by degree of similarity. In such a case, the foregoing processing is performed and the matching objects are then ordered based on the number of matching labels and presented to the user in this order. If too many objects have been identified (e.g., as determined by system 10 or as communicated to the system 10 by the user), then the process 40 preferably is repeated using a larger set of sample vectors 80 and/or a larger number of identified labels for the feature vector 60, in order to attempt to identify closer matches within database 17.

One particular application of the present invention is in the area of collaborative filtering. For example, a large group of people might rate movies, books, restaurants or any other products or services and then, based on these ratings, products and services can be suggested to individuals based on similarities in ratings. In such an application, the system 10 first attempts to identify matches (e.g., other users) for a particular end user and then delivers content to the end user based on information regarding at least one of the matches that have been identified. For example, in the collaborative filtering scenario, if the query identifies two individuals who appear to have very similar interests and/or preferences as the subject individual (about whom the query was formulated), then (potentially after validating such matches using more detailed processing) certain movies or books that those two matching individuals enjoyed might be recommended to the subject individual.

Rather than performing such collaborative filtering with respect to individuals, it instead can be performed with respect to groups are clusters of individuals. In such a scenario, the system 10 preferably classifies individuals into clusters based on the numbers and/or strengths of the matches identified in step 47 (e.g., but otherwise using conventional clustering techniques). Then, books, movies or other items can be recommended to the user based on the preferences of other individuals within the same cluster.

The process 40 generally assumes that each object (e.g., input query object 12) is to be represented by a single feature vector. However, in certain embodiments the input objects 12 are best represented by multiple feature vectors, e.g., with each describing attributes of a different high-level feature of the overall object.

Figure 4:
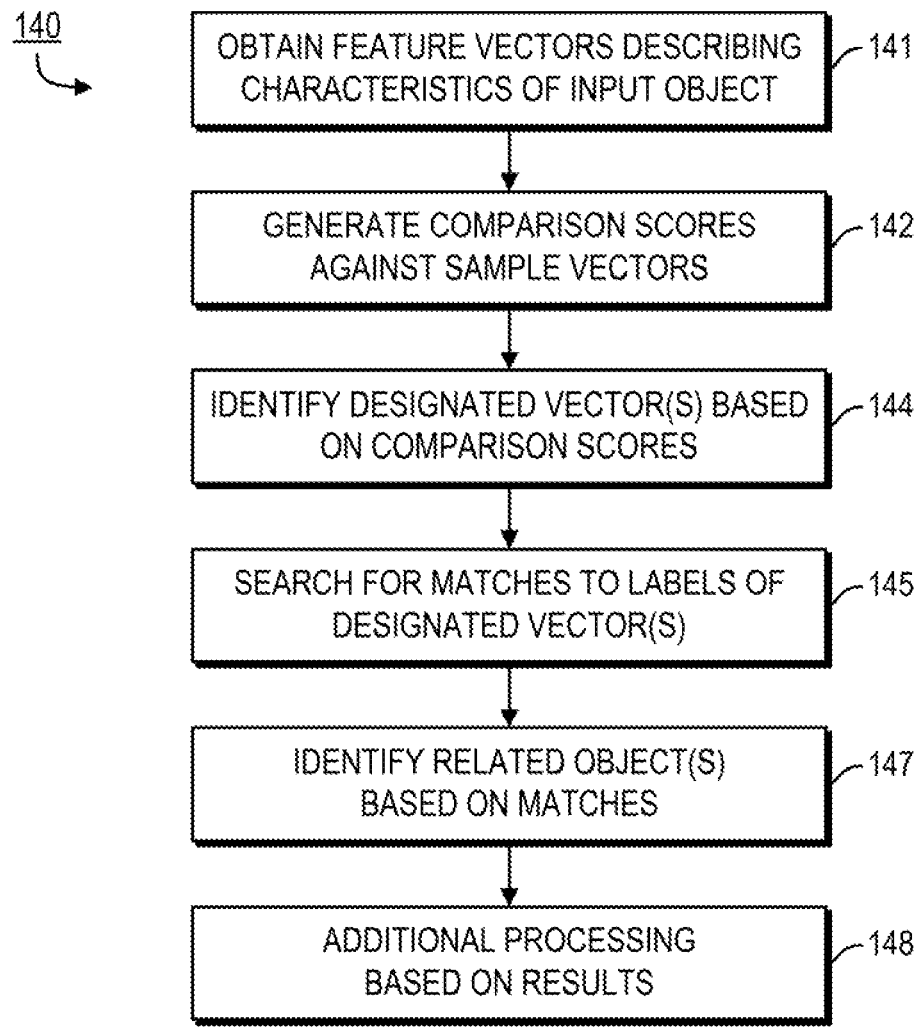
FIG. 4 is a flow diagram of a process that involves searching for related objects, according to a second representative embodiment of the present invention.

A process 140 for accommodating these kinds of situations is now described with primary reference to FIG. 4. In the preferred embodiments, process 140 is fully automated, e.g., so that it can be implemented by a processor reading and executing process steps out of a computer-readable medium or in any of the other ways described herein.

Figure 5:
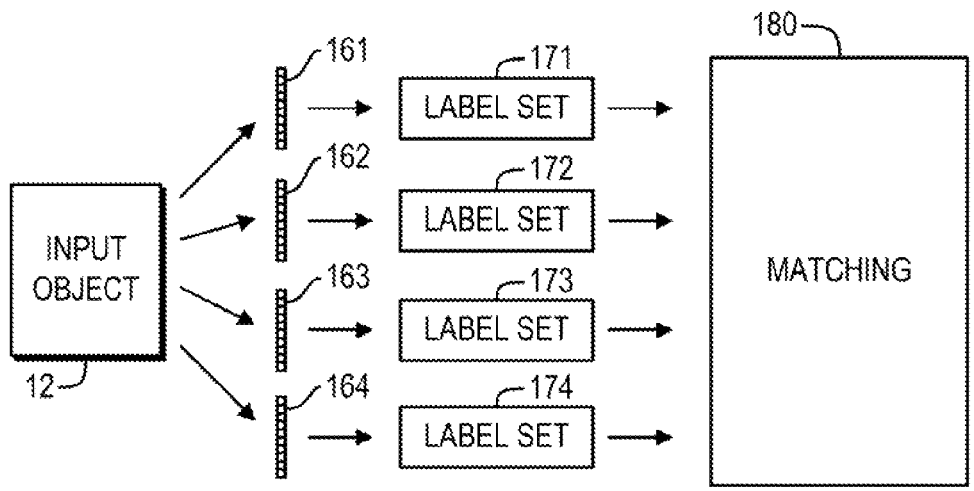
FIG. 5 is a block diagram illustrating a process in which multiple feature vectors and corresponding sets of labels are identified for a single object.

Initially, in step 141 multiple feature vectors (e.g., feature vectors 161-164 shown in FIG. 5) are obtained for the input object 12. In the preferred embodiments, this step is similar or identical to step 41, described above, except that rather than a single feature vector 60, multiple feature vectors 161-164 are obtained for the single input object 12. Although FIG. 5 illustrates, and the following discussion generally describes the use of, four feature vectors 161-164, it should be noted that this number is merely exemplary and any other number of feature vectors instead can be generated, e.g., depending upon the nature of the object and the kinds of related objects the user (or designer of the system) wishes to identify.

For example, in embodiments where the input object 12 is a photograph, there often will be hundreds of feature vectors, e.g., each describing a different portion or aspect of the photograph. In certain specific examples, a different feature vector is used for each attention point within the image, each specified attention point within an image, each set (e.g., pair) of attention points within the image, or each specified set of attention points within the image. Where each feature vector corresponds to an attention point, the elements of the feature vector preferably are pixel values or other image information within a region around the attention point.

In some of the foregoing embodiments, the number of feature vectors can be different for different objects. In others, the number of feature vectors is held constant for each object (e.g., by using a scoring technique to select only a specified number of the most prominent attention points).

In still further embodiments, the high-level features (and thus the number of feature vectors) are pre-defined, with each capturing a different aspect of the overall object. For example, if the object 12 is an individual person, one feature vector might be used to reflect the individual's personal preferences, another to reflect his or her financial situation, and a third to reflect his or her relationships (e.g., social and/or business networks) with other individuals and/or entities.

In step 142, a set of comparison scores is generated for each of the feature vectors 161-164, e.g., by comparing each such feature vector to a corresponding set of sample vectors. With respect to each individual feature vector 161-164, the considerations pertaining to the generation of the comparison scores preferably are similar or identical to the generation of comparison scores in step 42, discussed above. In the present case, the same set of sample vectors can be used across all feature vectors 161-164 or different sets of sample vectors can be used for different ones of the feature vectors 161-164, e.g., depending on the nature of the individual feature vectors and/or whether any is to be emphasized differently than the others. Similarly, the techniques used for determining the comparison scores either can be the same across all feature vectors 161-164 or can be different for different ones of the feature vectors 161-164, e.g., again depending on the nature of the individual feature vectors and whether any is to be emphasized differently than the others.

Typically, where all of the feature vectors represent similar features (e.g., both qualitatively and in terms of importance) the same set of sample vectors and the same technique for determining the comparison scores preferably are used for each feature vector. On the other hand, e.g., where the feature vectors represent qualitatively different aspects of the input object 12, different sets of sample vectors and/or different techniques for calculating the comparison scores often will be used for different ones of the feature vectors.

For example, where the input object 12 is an image and the feature vectors correspond to different regions of the image, the set of sample vectors preferably is identical across all feature vectors and, more preferably, reflect prototypical subimages. In one specific example, the prototypical sub-images form a set $\{I_1, I_2, \ldots I_k\}$, where each image $I_i$ is composed of two white rectangles on a black background, the positions and sizes of the rectangles being chosen randomly or according to a specified criterion. In another example, each image $I_i$ is a grid of white squares on a black background, the position and number of white squares having been chosen according to a specified criterion.

In step 144, designated vectors are selected from among the sample vectors based on the comparison scores determined in step 142. Depending on the particular embodiment, the designated vectors either are (1) determined separately for each of the feature vectors 161-164 (e.g., by selecting one or two of the sample vectors for each such feature vector), (2) are determined separately for separately defined groups of the feature vectors 161-164, or (3) are determined in an aggregate manner across all feature vectors 161-164.

The first approach (which is illustrated in FIG. 5) generally is preferred and can be appropriate, e.g., in embodiments where it is desirable to have each feature vector (or the feature underlying each feature vector) represented. However, the second approach can be appropriate, e.g., in embodiments where it is possible to group together similar feature vectors (e.g., describing similar features of the overall input object 12, such as different regions of a photograph) and where it is desirable to identify the closest matches across all feature vectors. The third approach is similar to the second and can be appropriate, e.g., where all of the feature vectors are similar to each other.

In any event, any (or any combination) of the identification criteria described above in connection with step 44 (or any other identification criterion) can be used in step 144. In any event, the end result of step 144 is a plurality of labels for the identified sample vectors. In the first approach discussed above, such labels preferably are grouped into individual sets 171-174 corresponding to their respective individual feature vectors 161-164 (as shown in FIG. 5); in the second approach, such labels preferably are grouped into individual sets corresponding to their respective groups of feature vectors; and in the third approach, such labels preferably are not separately grouped.

It is noted that in certain embodiments of the first approach, different numbers of designated vectors are identified for a different feature vectors. Such a feature can be desirable when the different feature vectors have different statistical properties. Similarly, in the second approach different numbers of designated vectors can be identified for different groups feature vectors, e.g., based on a number of feature vectors within the group and/or based on the different statistical properties of the kinds of feature vectors within each group.

In step 145, database 17 is searched for identical matches to the labels for the designated vectors identified in step 144. In the preferred embodiments, this step is similar or identical to step 45, discussed above.

In step 147, objects are identified based on the matches identified in step 145 and a specified matching criterion. This step preferably is similar or identical to step 47, discussed above. However, similar to step 144, in different embodiments the present matching can be performed separately for each set of labels (e.g., labels 171-174), across specified groups of such sets, across all of such sets, or any combination of the foregoing. In addition, different matching criteria or the same matching criterion can be used for different sets of labels.

For example, in the embodiment illustrated in FIG. 5 (in which a separate labels set 171-174 is maintained for each feature vector 161-164, respectively) each object represented within the database 17 preferably is assigned a score based on the number of feature vectors that it matches (e.g., using a minimum criterion, such as at least one matching label) and the degree of matching (e.g., with a match of two labels for a particular feature being assigned a larger number of points than a match of just a single label for that feature). In one specific implementation, there is no difference in weighting for the first and second label matches for a given feature, so that the score is simply equal to (or a function of) the total number of label matches. In addition, an object's score can be modified based on the pattern in which feature matches are made. For example, in certain embodiments a storage image that is represented within database 17 is given a higher score or if the pattern of matching features is strongly related to the pattern of corresponding features in the input object 12. In any event, the objects represented within database 17 having a minimum threshold score are identified as matching.

Similar to process 40, discussed above, the search for matching labels in step 145 typically is closely related to (and can even be dependent upon) the identification of related objects in step 147. The processing block 180 (shown in FIG. 5) for matching the identified labels 171-174 performs both such steps.

Finally, in step 148 any additional processing is performed. Preferably, the considerations pertaining to this step are similar or identical to those discussed above in connection with step 48.

Figure 6:
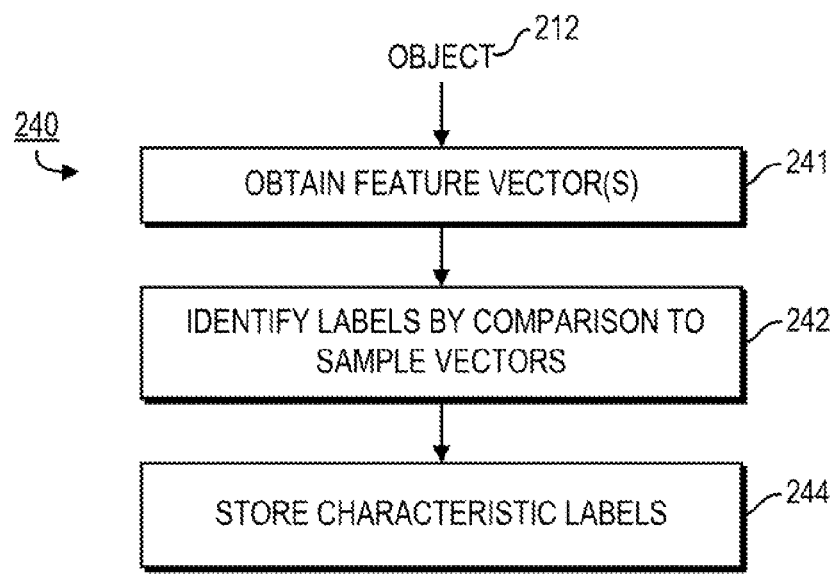
FIG. 6 is a flow diagram of a process for generating an object database.

One aspect of the database-searching techniques described above is the existence of a database 17. FIG. 6 is a flow diagram illustrating one process 240 for generating and/or organizing such a database. Preferably, the steps of process 240 are performed in a fully automated manner so that the entire process 240 can be performed by executing computer-executable process steps from a computer-readable medium or in any of the other ways described herein. In the preferred embodiments, the steps of the process 240 are repeated for each object 212 that is to be represented within the database 17.

Initially, in step 241 one or more feature vectors are obtained for the object 212. Preferably, this step 241 and the considerations pertaining to it are similar or identical to step 41 and/or step 141, discussed above.

In step 242, one or more characteristic labels are identified for the feature vector(s) obtained in step 241, e.g., by comparing such feature vector(s) to corresponding sample vectors. Preferably, this step 242 and the considerations pertaining to it are similar or identical to a combination of steps 42 and 44 and/or a combination of steps 142 and 144, discussed above. In fact, for a given system 10, the same set(s) of sample vectors preferably are used for processing the query object 12 and for each object 212 in database 17.

Finally, in step 244 the characteristic labels identified in step 242 are stored in association with an identifier for the object 212. In certain embodiments, such characteristic labels are stored in an undifferentiated manner, while in other embodiments they are associated with individual feature vectors or groups of feature vectors, or at least stored in such a manner so as to indicate which pertain to the same feature vector or group of feature vectors.

In the preferred embodiments, the characteristic labels are stored in a manner so as to facilitate future querying. Thus, for example, in certain embodiments the characteristic labels are used as an access into an index which stores an indication of which objects correspond to such characteristic labels.

The foregoing discussion sometimes refers to a criterion that must be satisfied (e.g., in order for a match to be declared). It is noted that any such criterion can include multiple parts and different combinations of parts, as well as requirements as to how such parts must be satisfied requirements in order to satisfy the overall criterion (e.g., which parts are conditional and which may be satisfied in the alternative).

System Environment

Generally speaking, except where clearly indicated otherwise, all of the systems, methods and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks, e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system), which networks, in turn, in many embodiments of the invention, connect to the Internet or to any other networks; a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM. However, in some cases the process steps initially are stored in RAM or ROM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored software or firmware program instructions (i.e., computer-executable process instructions) for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memory devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device. As used herein, unless clearly noted otherwise, references to computer-executable process steps stored on a computer-readable or machine-readable medium are intended to encompass situations in which such process steps are stored on a single medium, as well as situations in which such process steps are stored across multiple media.

The foregoing description primarily emphasizes electronic computers and devices. However, it should be understood that any other computing or other type of device instead may be used, such as a device utilizing any combination of electronic, optical, biological and chemical processing.

Additional Considerations

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of identifying related objects in a computer database, comprising:
   (a) obtaining a feature vector that describes an existing object;
   (b) generating comparison scores between the feature vector and plural sample vectors, the plural sample vectors selected to preclude having to directly compare the existing object to a plurality of other objects in the computer database for identifying at least one related object to the existing object;
   (c) identifying a set that includes at least one designated vector, from among the sample vectors, by evaluating the comparison scores generated in step (b);
   (d) searching a computer database for matches between at least one label for the at least one designated vector and labels for representative vectors for the other objects; and
   (e) identifying the at least one related object based on at least one match identified in step (d), the at least one related object being identified as related to the existing object without directly comparing the existing object to the at least one related object,
   wherein the sample vectors that are identified as the at least one designated vector serve as a proxy to which the existing object and the other objects are directly compared to identify the at least one related object for the existing object without having to directly compare the existing object to the other objects.

2. A method according to claim 1, wherein the set identified in step (c) is constrained to include exactly one designated vector.

3. A method according to claim 1, wherein the set identified in step (c) is constrained to include exactly two designated vectors.

4. A method according to claim 1, wherein the set identified in step (c) is constrained to include a pre-specified number of designated vectors that are most similar to the feature vector, as indicated by the comparison scores, the pre-specified number being at least two.

5. A method according to claim 1, wherein each of a plurality of the comparison scores comprises an inner product between the feature vector and a corresponding one of the plural sample vectors.

6. A method according to claim 1, wherein the sample vectors have been generated randomly or pseudo-randomly.

7. A method according to claim 1, wherein plural of the sample vectors have been selected to represent exemplary patterns of a category to which the existing object belongs.

8. A method according to claim 7, wherein the exemplary patterns comprise image patterns.

9. A method according to claim 1, wherein the labels for the other objects represented within the computer database have been identified from among the sample vectors in a substantially identical manner as the at least one designated vector.

10. A method of identifying related objects in a computer database, comprising:
    (a) obtaining a plurality of feature vectors that describe corresponding different features of an existing object;
    (b) for each of the feature vectors, generating a comparison score between said feature vector and each of plural corresponding sample vectors, the plural sample vectors selected to preclude having to directly compare the existing object to a plurality of other objects in the computer database for identifying at least one related object to the existing object;
    (c) identifying a set that includes a plurality of designated vectors, from among the sample vectors, by evaluating the comparison scores generated in step (b) in relation to a specified identification criterion;
    (d) searching a computer database for identical matches between labels for the designated vectors and labels for representative vectors which represent other objects in the computer database; and
    (e) identifying the at least one related object based on at least one identical match identified in step (d) and a specified matching criterion, the at least one related object being identified as related to the existing object without directly comparing the existing object to the at least one related object;
    wherein the sample vectors that are identified as the at least one designated vector serve as a proxy to which the existing object and the other objects are directly compared to identify the at least one related object for the existing object without having to directly compare the existing object to the other objects.

11. A method according to claim 10, wherein the designated vectors are identified in said step (c) by independently processing each of the feature vectors.

12. A method according to claim 10, wherein the specified matching criterion is based on a total number of matching labels for different ones of the other objects.

13. A method according to claim 10, further comprising a step assigning overall matching scores to the related objects identified in step (e).

14. A method according to claim 13, further comprising a step of sorting the related objects based on the overall matching scores.

15. A non-transitory computer-readable medium storing computer-executable process steps for identifying related objects in a computer database, said process steps comprising:
    (a) obtaining a feature vector that describes an existing object;
    (b) generating comparison scores between the feature vector and plural sample vectors, the plural sample vectors selected to preclude having to directly compare the existing object to a plurality of other objects in the computer database for identifying at least one related object to the existing object;
    (c) identifying a set that includes at least one designated vector, from among the sample vectors, by evaluating the comparison scores generated in step (b);
    (d) searching a computer database for matches between at least one label for the at least one designated vector and labels for representative vectors for a plurality of other objects represented in the computer database; and
    (e) identifying the at least one related object based on at least one match identified in step (d), the at least one related object being identified as related to the existing object without directly comparing the existing object to the at least one related object
    wherein the sample vectors that are identified as the at least one designated vector serve as a proxy to which the existing object and the other objects are directly compared to identify the at least one related object for the existing object without having to directly compare the existing object to the other objects.

* * * * *